United States Patent
Atkinson

(10) Patent No.: US 12,069,542 B1
(45) Date of Patent: Aug. 20, 2024

(54) REDUNDANT ASSET TRACKING

(71) Applicant: Geotab Inc., Oakville (CA)

(72) Inventor: Glenn H. Atkinson, Palgrave (CA)

(73) Assignee: Geotab Inc., Oakville (CA)

( * ) Notice: Subject to any disclaimer, the term of this patent is extended or adjusted under 35 U.S.C. 154(b) by 349 days.

(21) Appl. No.: 17/684,611

(22) Filed: Mar. 2, 2022

Related U.S. Application Data

(63) Continuation of application No. 17/491,713, filed on Oct. 1, 2021, now abandoned.

(60) Provisional application No. 63/088,128, filed on Oct. 6, 2020.

(51) Int. Cl.
*H04W 4/029* (2018.01)
*H04W 84/04* (2009.01)
*H04W 84/06* (2009.01)

(52) U.S. Cl.
CPC .......... *H04W 4/029* (2018.02); *H04W 84/042* (2013.01); *H04W 84/06* (2013.01)

(58) Field of Classification Search
CPC ....... H04W 4/02; H04W 4/023; H04W 4/025; H04W 4/029; H04W 84/042; H04W 84/06
See application file for complete search history.

(56) References Cited

U.S. PATENT DOCUMENTS

| | | | |
|---|---|---|---|
| 5,712,789 A | 1/1998 | Radican | |
| 6,429,810 B1 | 8/2002 | De Roche | |
| 7,069,239 B2 | 6/2006 | Fawcett et al. | |
| 7,405,655 B2 | 7/2008 | Ng et al. | |
| 7,484,663 B2 | 2/2009 | Olsen, III et al. | |
| 7,667,438 B2 | 2/2010 | Ashtiani et al. | |
| 7,821,416 B2 | 10/2010 | Venture et al. | |
| 8,452,643 B2 | 5/2013 | Spannagl | |
| 8,515,413 B1 | 8/2013 | Schilit et al. | |
| 8,538,838 B2 | 9/2013 | Doyle, III | |
| 9,595,142 B2 | 3/2017 | Greenberger | |
| 9,784,587 B1 | 10/2017 | Greenspan et al. | |
| 10,173,486 B1 | 1/2019 | Lee et al. | |
| 10,242,572 B2 | 3/2019 | Doyle, III | |
| 10,356,577 B1 * | 7/2019 | Kugler | G06Q 10/0833 |

(Continued)

FOREIGN PATENT DOCUMENTS

| | | |
|---|---|---|
| CA | 2793865 C | 3/2018 |
| EP | 3 190 599 A1 | 7/2017 |

(Continued)

OTHER PUBLICATIONS

Cawse et al., Asset travel monitoring with linked asset tracking devices. Co-pending U.S. Appl. No. 17/991,225, filed Nov. 21, 2022.

(Continued)

*Primary Examiner* — Siu M Lee
(74) *Attorney, Agent, or Firm* — Wolf, Greenfield & Sacks, P.C.

(57) ABSTRACT

This disclosure proposes a system in which two redundant asset tracking devices are used to monitor a single asset (such as a vehicle, which may contain a group of assets in cargo) via two distinct communication systems that operate in parallel, and which may operate in addition to any primary mode of communication used by the asset tracking devices (e.g., cellular communication). In some examples, each asset tracking device may communicate through separate and distinct satellite communication networks.

3 Claims, 1 Drawing Sheet

(56) References Cited

U.S. PATENT DOCUMENTS

| | | |
|---|---|---|
| 10,473,750 B2 | 11/2019 | Hergesheimer |
| 10,902,723 B2 | 1/2021 | Doyle, III |
| 10,957,204 B1 | 3/2021 | Kumar et al. |
| 11,427,169 B2 | 8/2022 | Ripley et al. |
| 11,526,835 B2 | 12/2022 | Cawse et al. |
| 11,552,495 B2 | 1/2023 | Howell et al. |
| 11,578,978 B1 | 2/2023 | Hickey |
| 11,650,329 B2 | 5/2023 | Howell et al. |
| 2005/0189919 A1 | 9/2005 | Tsuchiya et al. |
| 2006/0098390 A1 | 5/2006 | Ashtiani et al. |
| 2006/0261944 A1 | 11/2006 | Ng et al. |
| 2008/0061963 A1 | 3/2008 | Schnitz et al. |
| 2009/0204354 A1 | 8/2009 | Davis et al. |
| 2011/0133888 A1 | 6/2011 | Stevens et al. |
| 2013/0147617 A1 | 6/2013 | Boling et al. |
| 2013/0278227 A1 | 10/2013 | Knitt et al. |
| 2013/0328703 A1* | 12/2013 | Doyle, III ............... G08G 1/20 340/989 |
| 2014/0125501 A1 | 5/2014 | Baade |
| 2014/0372335 A1 | 12/2014 | Jones et al. |
| 2015/0243172 A1 | 8/2015 | Eskilson |
| 2016/0212586 A1 | 7/2016 | Ziskind et al. |
| 2017/0278061 A1 | 9/2017 | Skaaksrud |
| 2018/0059251 A1 | 3/2018 | Elliott |
| 2019/0066042 A1 | 2/2019 | Conlon |
| 2019/0103755 A1 | 4/2019 | Seberger et al. |
| 2019/0220077 A1 | 7/2019 | Tuan et al. |
| 2019/0391634 A1 | 12/2019 | Ayoub |
| 2020/0004996 A1* | 1/2020 | Kawaguchi ............... G01K 7/22 |
| 2020/0160722 A1 | 5/2020 | Brugman et al. |
| 2020/0196117 A1* | 6/2020 | Denninghoff ........... H04W 4/35 |
| 2020/0409929 A1 | 12/2020 | Kodavarti et al. |
| 2020/0412163 A1 | 12/2020 | Huang et al. |
| 2021/0264789 A1 | 8/2021 | Jo et al. |
| 2021/0304120 A1 | 9/2021 | Hill et al. |
| 2021/0304592 A1 | 9/2021 | Lepp et al. |
| 2021/0312726 A1 | 10/2021 | Schäfer et al. |
| 2021/0325547 A1 | 10/2021 | Howell et al. |
| 2021/0326807 A1 | 10/2021 | Howell et al. |
| 2021/0328451 A1 | 10/2021 | Howell et al. |
| 2022/0147922 A1 | 5/2022 | Cawse et al. |
| 2023/0112513 A1 | 4/2023 | Cawse et al. |

FOREIGN PATENT DOCUMENTS

| | | |
|---|---|---|
| EP | 3 598 359 A1 | 1/2020 |
| GB | 2 540 039 A | 1/2017 |
| WO | WO 2020/069581 A1 | 4/2020 |

OTHER PUBLICATIONS

Hickey, Associating a telematics device with an asset tracker.
Co-pending U.S. Appl. No. 18/142,184, filed May 2, 2023.
Santa et al., Telematic platform for integral management of agricultural/perishable goods in terrestrial logistics. Computers and Electronics in Agriculture. Jan. 1, 2012;80:31-40.

\* cited by examiner

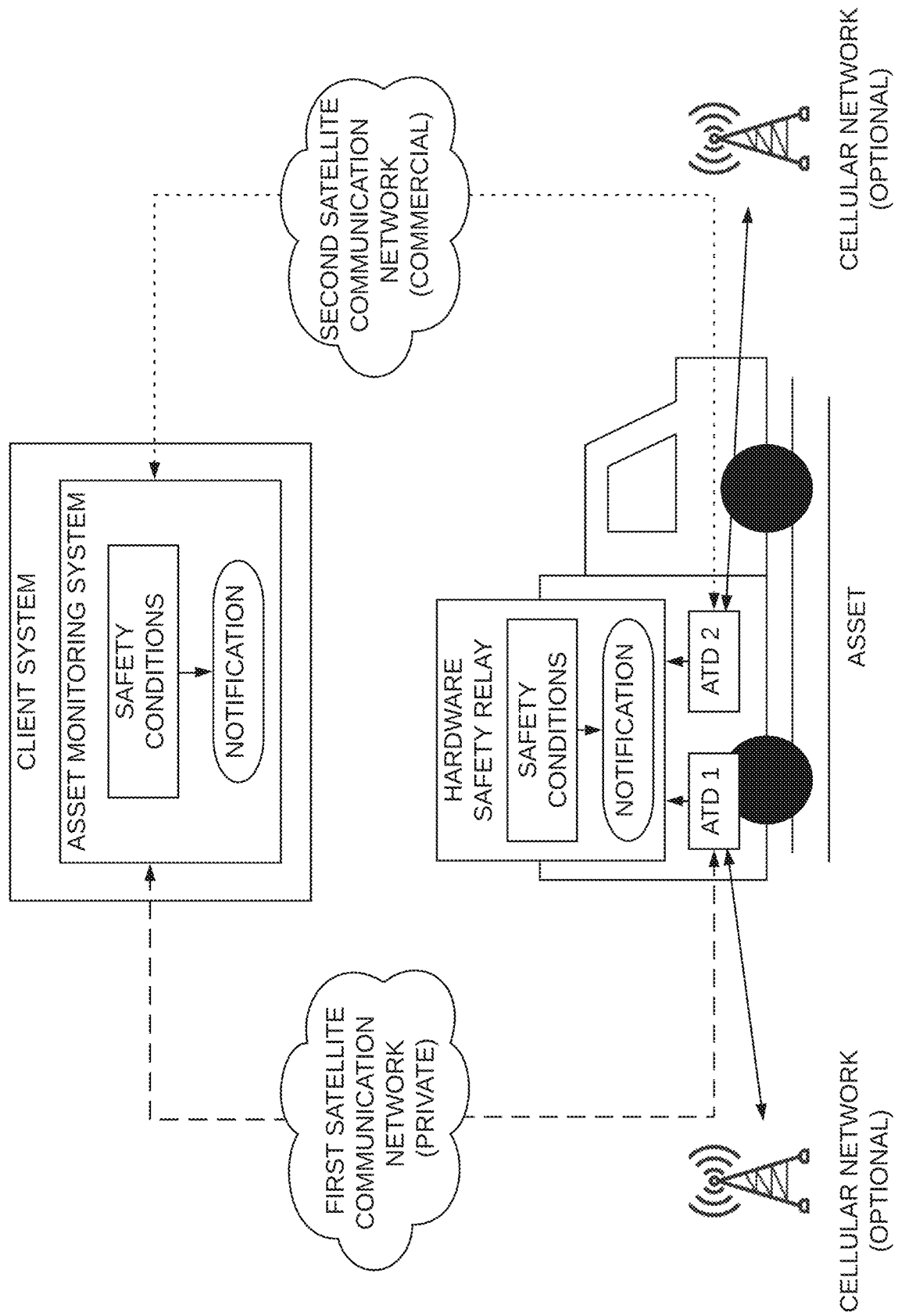

REDUNDANT ASSET TRACKING

CROSS-REFERENCE TO RELATED APPLICATIONS

This application claims the benefit under 35 U.S.C. § 120 as a continuation of U.S. application Ser. No. 17/491,713, filed Oct. 1, 2021, which claims the benefit under 35 U.S.C. § 119(e) of U.S. Provisional Application Ser. No. 63/088,128, filed Oct. 6, 2020, the entire contents of each of which applications are incorporated by reference as set forth herein.

FIELD

The present disclosure relates to asset tracking and telematics.

BACKGROUND

In the field of telematics, an asset may be tracked by an asset tracking device placed on the asset that collects location and other information about the asset. These asset tracking devices will typically communicate with one or more positioning systems (e.g, Global Positioning System (GPS)) to track the location of the asset, one or more sensors onboard the asset (e.g., accelerometers, temperature sensors) to gather additional data about the status of the asset, and in some cases, especially where the asset is a vehicle, with systems onboard the asset directly (e.g, an Electronic Control Unit of a vehicle) through a communication port (e.g, an OBD2 port) to gather further data from the asset itself (e.g., engine data). These asset tracking devices are typically in connection with one or more back-end data collection systems via one or more telecommunications systems (e.g., a cellular network), to which the data gathered at the asset is forwarded, which such data is recorded and presented to an end-user (e.g., in the provision of a telematics service), or for analysis.

SUMMARY

In some embodiments, there is provided a system comprising a first asset tracking device to track a mobile asset and a second asset tracking device to track the mobile asset. The first asset tracking device is connected to a first communication network. The second asset tracking device is redundant with the first asset tracking device and is connected to a second communication network that is distinct from, and redundant with, the first communication network. The system further comprises a hardware safety relay located at the mobile asset. The hardware safety relay is directly connected to the first and second asset tracking devices to monitor fault statuses of the first and second asset tracking devices. The system further comprises an asset monitoring system located at a client system and connected to the first asset tracking device via the first communication network and the second asset tracking device via the second communication network. The asset monitoring system is to monitor fault statuses of the first and second asset tracking devices. In the system, the hardware safety relay and the asset monitoring system are to generate notifications of the fault statuses of the first and second asset tracking devices, and the asset monitoring system is to mirror the generation of such notifications at the hardware safety relay via updates transmitted through whichever of the asset tracking devices and/or communication networks are capable as per redundancy.

BRIEF DESCRIPTION OF THE DRAWINGS

The accompanying drawings are not intended to be drawn to scale. In the drawings, each identical or near identical component that is illustrated in various figures may be represented by a like numeral. For purposes of clarity, not every component may be labeled in every drawing. In the drawings:

FIG. 1 illustrates an example of a system in which a mobile asset is equipped with a hardware safety relay placed onboard the vehicle.

DESCRIPTION

Asset tracking devices, and the telecommunications networks on which they rely, may experience faults in operation. When a fault occurs (e.g., device failure or network failure, whether malicious or otherwise), the systems monitoring the assets may be left without any updates as to the status of the asset for an indeterminate amount of time. Such faults may occur when the asset travels through an area in which its primary mode of communication to back-end servers (e.g., cellular network coverage) becomes unavailable, when there is a hardware or firmware fault on the asset tracking device itself, or when there has been a malicious attempt to disable the asset tracking device or to remove the asset from its vicinity. In such instances, an operator of the asset/vehicle, or an operator at back-end systems (or both), may have imperfect and/or delayed knowledge as to the nature of the fault.

This disclosure proposes a system in which two redundant asset tracking devices are used to monitor a single asset (such as a vehicle, which may contain a group of assets in cargo) via two distinct communication systems that operate in parallel, and which may operate in addition to any primary mode of communication used by the asset tracking devices (e.g., cellular communication). In some examples, each asset tracking device may communicate through separate and distinct satellite communication networks.

As shown in FIG. 1, a mobile asset (in this case, a vehicle) is equipped with a hardware safety relay placed onboard the vehicle. The hardware safety relay is intrinsically fault tolerant, and will typically be viewable by an operator of the vehicle, but in most cases, not accessible by the operator. For example, the hardware safety relay may be located behind a panel in the cab of the vehicle. The hardware safety relay is directly connected to two separate asset tracking devices (ADT1, ADT2) onboard the vehicle (either wired or wirelessly), and monitors various conditions, including safety conditions, that indicate the health of the two asset tracking devices. The hardware safety relay may be connected to an emergency alarm button (not shown). The two asset tracking devices may be located in separate places onboard the asset (e.g., one in the cabin of the vehicle, the other mounted on the chassis exterior to the vehicle) to provide redundancy in case of malicious removal of one of the asset tracking devices. In some cases, one of the asset tracking devices may be embedded in the vehicle itself (e.g., a satellite tracker built into the vehicle systems).

At client systems, there is an asset monitoring system (e.g., a software platform that compiles and displays information received from the mobile asset) that mirrors the status of the hardware safety relay at the vehicle. The hardware safety relay monitors a set of conditions at the mobile asset and shares this information with the asset monitoring system. Both the hardware safety relay and the asset monitoring system may generate and provide notifications/indications of the status of the mobile asset (e.g., indicator light, text message on a screen). The conditions monitored by the hardware safety relay may include, for example: (i) each of the asset tracking devices are powered, (ii) each of the asset tracking devices has recently transmitted a ping to the client system, (iii) each of the asset tracking devices is connected over an alternative communication network (e.g., cellular network), (iv) an emergency alert button at the asset has not been activated, and (v) any other condition as may be programmed. Thus, when one of the asset tracking devices loses power, is removed, or loses network connectivity, each of the hardware safety relay and the asset monitoring system may indicate such a fault.

In the example shown, the first asset tracking device ATD1 is connected to the asset monitoring system at the client system via a first satellite communication network (private), and the second asset tracking device ATD2 is connected to the asset monitoring system at the client system via a second satellite communication network (commercial). In the example shown, the two satellite communication networks are distinct and rely on separate satellites to transmit communications. The two satellite communication networks may be of different classes (e.g., one satellite network comprises satellites in geosynchronous orbit whereas the other satellite network comprises satellites in non-geosynchronous orbit; satellites networks in low earth orbit vs. medium earth orbit vs. high earth orbit; private satellite network vs. commercial satellite network) so as to create redundancy with respect to phenomenon that may affect certain classes of satellites but not others. In any case, the use of two distinct satellite communication networks reduces the likelihood of a "common cause" satellite system failure. The two asset tracking devices may periodically send pings to the client system to indicate that the asset tracking devices maintain satellite connectivity.

It is emphasized that, in other examples, the asset tracking devices may communicate with the asset monitoring system via only a single common satellite communication network (which may be accessible by one or both of the asset tracking devices), in addition to an alternative communication network (e.g., cellular coverage). In such examples, the reliability of the tracking of the asset is still made more reliable by the redundancy provided by two separate asset tracking devices onboard the asset, and the redundancy provided by two redundant communication networks, reducing the likelihood of a "common cause" failure. Indeed, a degree of redundancy may be retained if the two asset tracking devices were to communicate over two separate cellular communication networks, without a satellite communication network. However, it is preferred that at least one of the redundant communication networks is a satellite communication network, as satellite communication networks typically offer greater geographic coverage than cellular networks, and may fill in gaps in geographic coverage where no cellular network coverage is available.

The hardware safety relay/ATDs may also be in communication with other asset tracking devices that track the cargo onboard the vehicle, for example, via near-field communication such as Bluetooth communication. The health (power status, connectivity status, presence of the asset tracking device in the vicinity or onboard the vehicle) of any of these asset tracking devices may also be incorporated into the list of conditions monitored by the hardware safety relay.

Synchronicity between the hardware safety relay and the asset monitoring system at the client system may be maintained via the transmission of information packets from the hardware safety relay to the asset monitoring system using one or both of the two communication networks. That is, when a fault is noticed at the hardware safety relay, an information packet may be transmitted via one or both of the communication networks to the asset monitoring system, while utilizing the redundancy built into the system. For example, when it is detected at the hardware safety relay that the ATD1 has lost power, the hardware safety relay may transmit an indication of such through an information packet via the second communication network to the client communication system (in addition to generating a notification at the hardware safety relay). When it is detected at the hardware safety relay that ATD2 has failed to transmit a ping within a threshold amount of time, the hardware safety relay may transmit an indication of such through an information packet via the first communication network to the asset monitoring system (in addition to generating a notification at the hardware safety relay).

Thus, delays in the detection of faults, and loss of information when a fault takes place, may be mitigated, and assets may be more securely tracked given the redundancy of two distinct hardware tracking devices and two distinct communication networks, such as two distinct satellite communication systems.

The invention claimed is:

1. A system comprising:
a first asset tracking device to track a mobile asset, the first asset tracking device connected to a first communication network;
a second asset tracking device to track the mobile asset, the second asset tracking device being redundant with the first asset tracking device and connected to a second communication network that is distinct from, and redundant with, the first communication network;
a hardware safety relay located at the mobile asset, the hardware safety relay directly connected to the first and second asset tracking devices to monitor fault statuses of the first and second asset tracking devices;
an asset monitoring system located at a client system and connected to the first asset tracking device via the first communication network and the second asset tracking device via the second communication network, the asset monitoring system to monitor fault statuses of the first and second asset tracking devices;
wherein the hardware safety relay and the asset monitoring system are to generate notifications of the fault statuses of the first and second asset tracking devices, the asset monitoring system to mirror the generation of such notifications at the hardware safety relay via updates transmitted through whichever of the asset tracking devices and/or communication networks are capable as per redundancy.

2. The system of claim 1, wherein:
the first communication network comprises a first satellite communication network; and
the second communication network comprises a second satellite communication network that is distinct from, and redundant with, the first satellite communication network.

3. The system of claim 1, wherein:
the first communication network comprises a cellular communication network; and the second communication network comprises a satellite communication network.

\* \* \* \* \*